Figure 1:
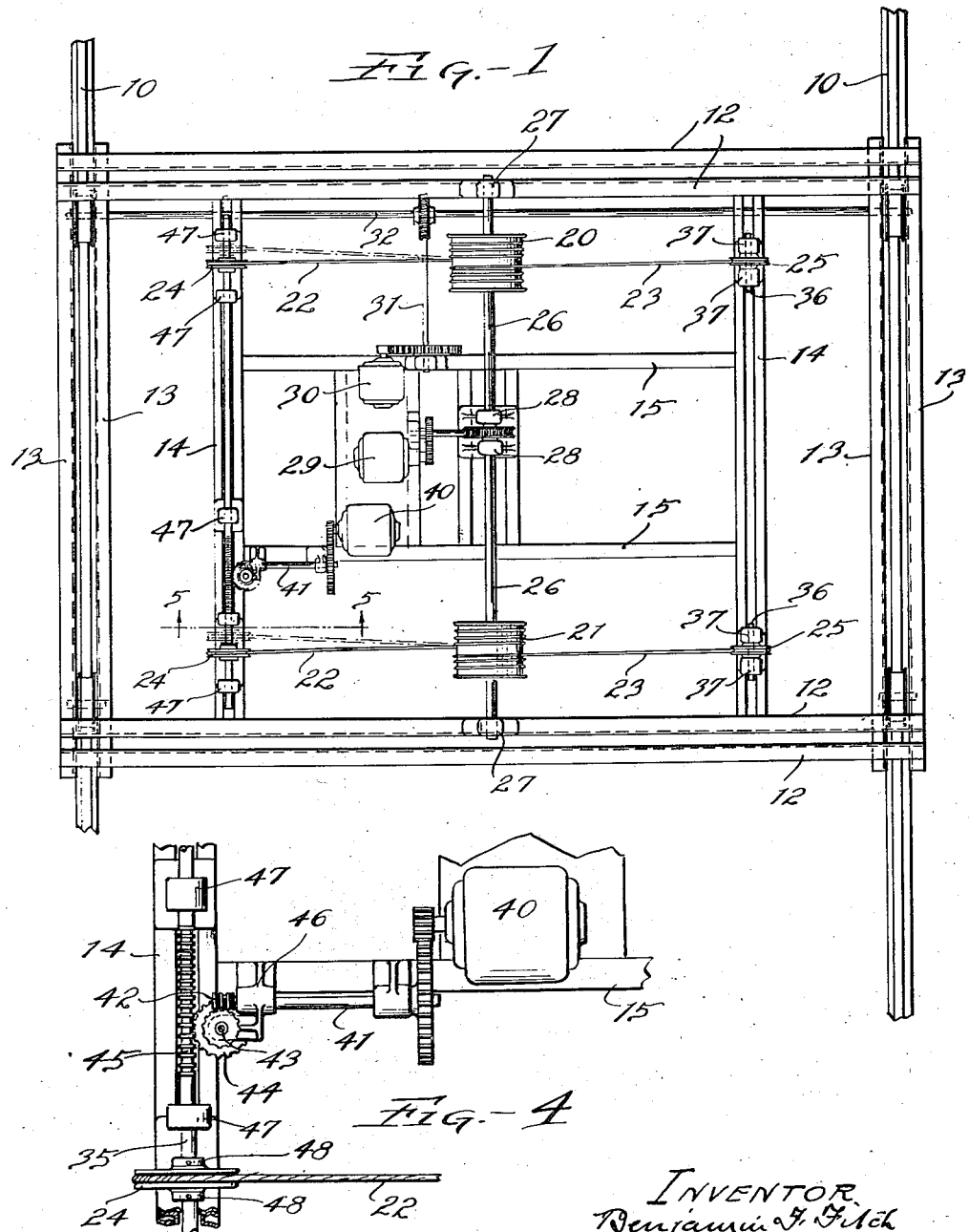

B. F. FITCH.
TRAVELING CRANE.
APPLICATION FILED JULY 6, 1921.

1,437,967.

Patented Dec. 5, 1922.
3 SHEETS—SHEET 2.

INVENTOR
Benjamin F. Fitch.
BY Bates & Macklin.
ATTORNEYS

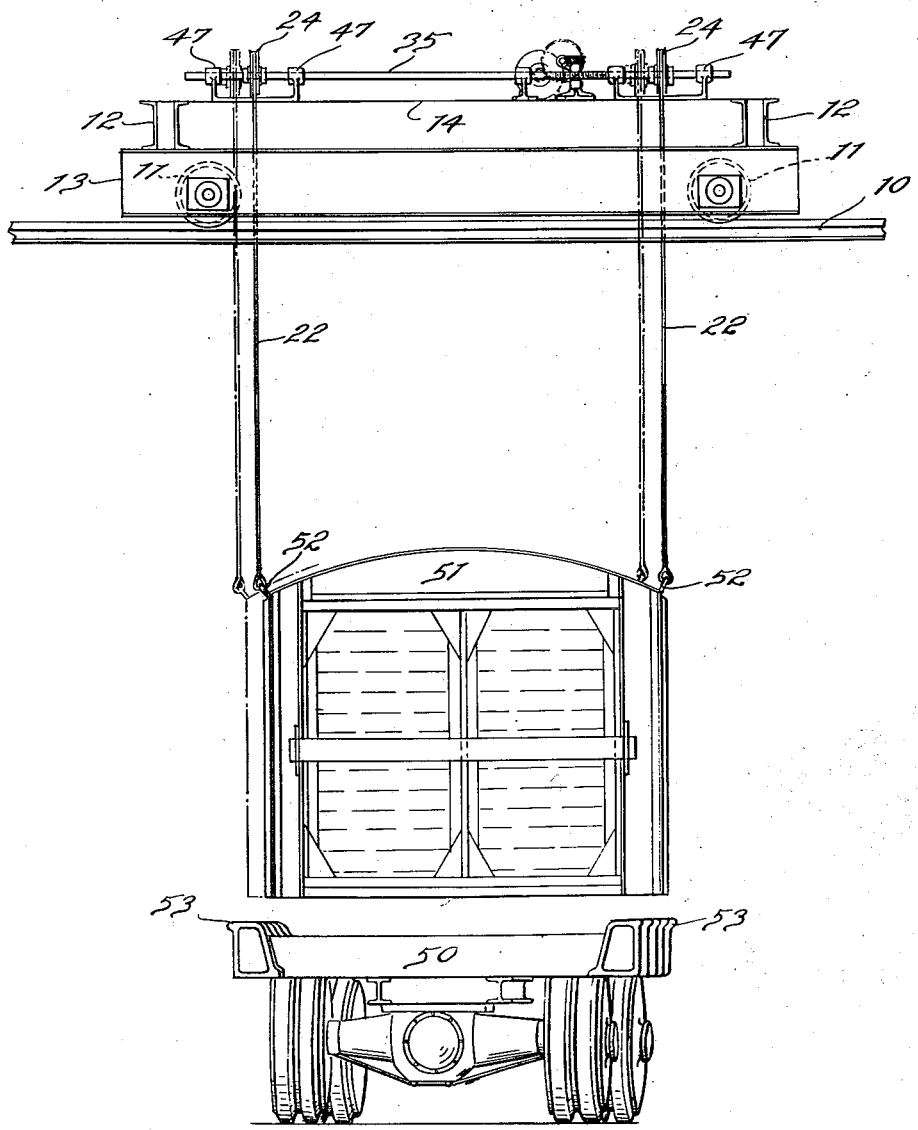

Patented Dec. 5, 1922.

1,437,967

UNITED STATES PATENT OFFICE.

BENJAMIN F. FITCH, OF EVANSTON, ILLINOIS.

TRAVELING CRANE.

Application filed July 6, 1921. Serial No. 482,665.

*To all whom it may concern:*

Be it known that I, BENJAMIN F. FITCH, a citizen of the United States, residing at Evanston, in the county of Cook and State of Illinois, have invented a certain new and useful Improvement in Traveling Cranes, of which the following is a full, clear, and exact description, reference being had to the accompanying drawings.

This invention relates to hoisting and conveying apparatus, and is particularly concerned with the provision of mechanism for skewing or twisting a load to bring it directly over a vehicle or other support. Such a mechanism is particularly applicable for use in connection with a system of handling freight wherein removable bodies are employed which may be transferred to and from automobile trucks.

In handling freight by such system, it is frequently advantageous to employ an overhead crane which travels on a trackway above a truck runway for raising and transporting the removable body to and from an automobile truck positioned in the runway. A convenient arrangement between the runway and overhead trackway is such that the truck carrying the removable body travels transversely of the trackway so that the truck may be moved forward or backward, and the crane may be moved laterally to position the hoisting mechanism over the removable body. However, in driving a truck beneath the trackway, it is not always possible to bring it directly at right angles to such trackway, and accordingly when the load is raised, to a point where it clears the corner brackets on the truck, the load is swung sideways with considerable force. Again, in placing the load upon the truck, the relation between the truck and trackway is such that it is necessary for the workman to employ crowbars for guiding the body into position on the truck. Naturally, this procedure necessitates considerable time during which the truck must remain idle.

As a means for adjusting the removable body while suspended so that it may be directly deposited on the truck, or correspondingly adjusting the raising cables to vertically lift a body from the truck, a hoisting mechanism embodying a turntable crane has been employed; but I have found, that frequently buildings, such as warehouses, terminal stations and the like, do not possess sufficient overhead space to enable the installation of such a crane, without effecting unwarranted changes in the construction of the building.

One of the objects of my invention therefore, is the provision of means which may be employed in connection with non-rotatable cranes for skewing or twisting the load engaging elements, to position them accurately over the load to be raised, so that the load may be lifted vertically from its support, or deposited thereon, without necessitating the employment of guiding tools.

Another object is the provision of such simple skewing means that it may be incorporated in existing forms of hoisting and traversing cranes, without necessitating material changes in the structure thereof. Other features include general simplification of the construction of a direct lift hoist possessing the skewing characteristic above mentioned.

In carrying out my invention I have shown a hoisting apparatus of the drum and cable type, and I provide means for shifting some of the cables laterally with relation to the drum, whereby a load may be skewed, or twisted, a slight amount and in either direction. In this connection, my invention contemplates the provision of a mechanism for skewing a load, by mechanism which is operable independently of the hoisting mechanism so that the load may be twisted irrespective of the relation between the automobile truck and the hoisting apparatus.

The preferred form of carrying out my invention is set forth in the following description, which relates to the drawing, and the essential characteristics and features are set forth in the claims.

Figure 2:
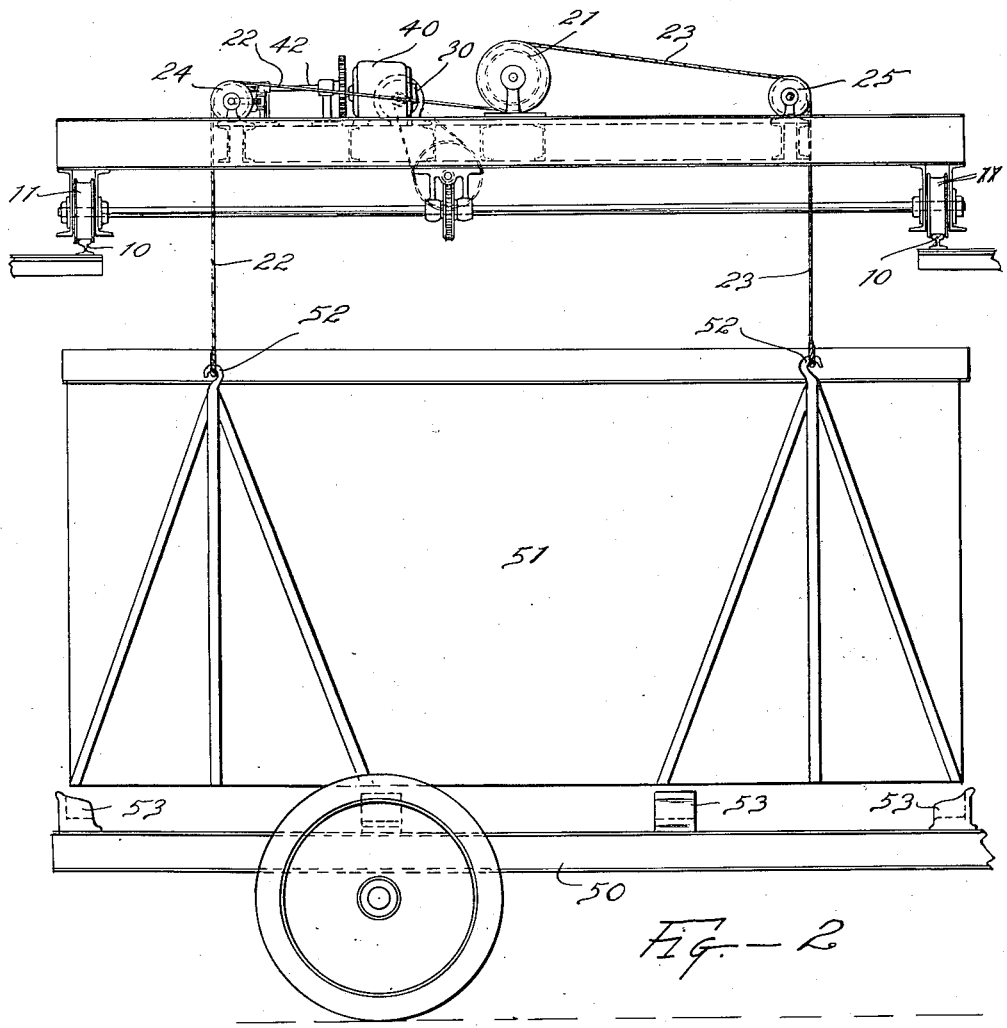
Figure 5:
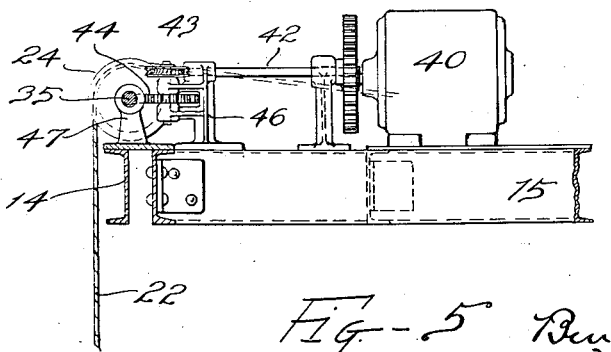

In the drawing, Fig. 1 is a plan view of a crane embodying features of my invention; Fig. 2 is a side elevation of a crane shown in Fig. 1, and as positioned above a removable automobile body; Fig. 3 is an end view of the mechanism shown in Fig. 2, with two positions of the body shown in full and dotted lines, respectively; Fig. 4 is an enlarged plan view of the mechanism employed for shifting the load engaging cables, and Fig. 5 is a vertical section taken on the lines 5—5 in Fig. 1.

My invention is shown in connection with an overhead hoisting mechanism which is employed for engaging, raising and transporting removable automobile bodies. Accordingly, in the various figures, 10 indicates a set of overhead tracks which support the traveling crane wheels 11 and constitute a trackway therefor. Supported on the wheels, I provide a frame which comprises longitudinal members 12 and transverse members 13; these members being shown as channel beams placed back to back, and arranged in the form of a rectangle. Spanning the longitudinal beams I provide a frame for supporting the hoisting mechanism, which frame may be a fabricated structure having sheave supporting beams 14 and motor supporting beams 15 extending therebetween. The frame work preferably comprises channel beams, which are held together in any convenient manner, and which are of such size as is necessary for the load to be conveyed.

The hoisting mechanism shown comprises two drums 20 and 21 with two sets of cables 22 and 23 leading from each drum. These cables lead over sheaves 24 and 25 which are positioned approximately in the form of a rectangle to correspond with the shape of the load to be lifted. The drums 20 and 21 are rigidly secured to the shaft 26, which shaft may be supported in bearings, as at 27 and 28, on the crane frame and motor frame, respectively. Suitable source of power for operating the hoisting mechanism may be obtained through the motor 29 which may be geared, as shown, with the shaft 26. I have shown the mechanism for operating the hoisting drum as being independent of the mechanism for traversing the crane. The crane traversing mechanism is shown as embodied in a motor 30, which is suitably geared to a lay shaft 31. This lay-shaft may be geared to the shaft 32, which last mentioned shaft is shown as extending from a wheel on one track to a wheel similarly positioned on the other track.

To cause the load to be skewed or twisted, I have shown the sheaves 24 as freely mounted so as to rotate about the shaft 35 whenever the cables are wound in or payed out from the drums 20 and 21. Similarly, the sheaves 25 are shown as being freely mounted on spindles 36, which spindles are supported in the individual bearing blocks 37. The cables leading over the sheaves 24 are arranged to be attached to one end of the load and those extending over the sheaves 25 to the other end of the load. Accordingly, if either set of sheaves are shifted axially, the end of the load directly beneath the sheaves is moved laterally, and therefore the load may be skewed to overcome any deviation in alignment between the hoisting cables and the point on the body to which the cables are to be attached.

The mechanism which I prefer to employ for shifting one end of the load is embodied in a motor 40 which may be geared to the shaft 41. This shaft may be connected through suitable worm gearing, as at 42, to the shaft 43, which in turn may be geared, as at 44, with the shaft 35. In the embodiment shown, the shaft 35 is provided with gear-teeth 45 which are adapted to mesh with the gear 44 and to transform rotary motion into translatory motion. A suitable bracket 46 mounted on one of the beams 15 may be employed for supporting both the shafts 42 and 43. Whenever the motor 40 is rotated, the shaft 35 is caused to move longitudinally of its axis, through the bearings 47, and the sheaves 24, by reason of the collars 48 on each side thereof, are caused to move longitudinally with the shaft.

Normally, the sheaves 24 are positioned opposite the sheaves 25, as shown in full lines in Fig. 1, in which position the gear 44 is approximately at the center of the geared portion 45 on the shaft 25. If it is desired to shift the sheaves 24 to the position shown in dotted lines in Fig. 1, it is only necessary to operate the motor 40—it being understood that the motor 40 is operated in either direction—whereupon rotary motion of the armature shaft is transformed into translatory motion of the shaft 35, by the gearing above described. When the sheaves are moved to the new position, the distance through which each sheave is moved is so small in proportion to the distance between the center lines of the drum shaft 26 and the sheave shaft 35, that each cable 22 is easily prevented from riding over the flange on the sheave.

As soon as the sheaves are moved laterally the desired amount, which amount is determined by the vertical relation between the hoisting cables and the load, then the motor 40 is stopped, whereupon the hoisting motor 29 may be operated to raise or lower the load. As soon as the load is raised or lowered, as the case may be, then the motor 40 may be operated in a reverse direction to bring the sheaves back to normal position, and thereby eliminate any bending stresses on the sheaves.

Assuming that the hoisting mechanism embodying features of my invention is positioned on an overhead trackway, which trackway extends transversely above a truck runway, and assuming further that a truck 50 having a loaded automobile body 51 is positioned beneath the truck runway, then the motor 30 is operated to move the crane longitudinally of the trackway 10, until the hoisting cables 22 and 23 are approximately over the removable body 51. To position the body more accurately with reference to the hoisting mechanism, the truck 50 is moved forwardly, or rearwardly, until the hooks 52 thereon are approximately beneath the load engaging cables 22 and 23, whereupon the hoisting motor 29 is operated to lower the cables, so that they may be brought into engagement with the hooks 52. If the automobile truck is positioned at a slight angle with the plane of the depending cables, then the crane is trolleyed along the trackway until the cables 23 are in position to be brought into engagement with the forward set of hooks on the body, whereupon the motor 40 is operated to shift the sheaves 24 axially, in the desired direction, so as to bring the cables 22 into position over the rear set of hooks on the body. After the cables are attached to the hooks then the hoisting motor 29 is again operated to raise the body, and as soon as the body is raised a predetermined amount, which in this case would be sufficient to clear the bracket 53, the motor 40 may be again operated to bring the sheaves 24 back to normal position, whereupon the crane may be trolleyed to deposit the body on a suitable platform or other support.

In lowering the loaded body onto the truck, the procedure above described is simply reversed. This enables the body to be positioned directly over the truck by the simple operation of the crane, with the consequent saving in time over working the body into position by prying.

It should be noted that while the maximum amount of skewing obtainable by the specific mechanism shown is comparatively small, experience has demonstrated that no great amount is needed, for the truck drivers readily acquire sufficient skill to place the truck beneath the hoist with such comparative accuracy as brings the body well within the range of the mechanism shown.

If it should be desired to increase the maximum amount of skewing, it is obvious that this may be accomplished by shifting the non-shiftable sheaves shown in the opposite direction to the others. This may be readily effected by mechanism similar to that shown for shifting the other sheaves, the two shiftable shafts being operated by a common motor to shift the sets in opposite directions. By employing an arrangement of this character the degree of twist to which the load may be subjected is doubled, and hoisting apparatus thereby possesses to a greater extent the characteristics of a turntable crane.

Having thus described my invention, I claim:

1. In combination, a rigid frame, load-engaging elements carried thereby, means for raising and lowering said elements, and other means for shifting some of the elements relatively to the others without shifting the frame, whereby one end of a load suspended therefrom may be swung laterally.

2. In combination, an overhead trackway, a rigid frame traveling thereon, load-engaging cables depending therefrom, means for raising and lowering said cables, and means for shifting some of the cables relatively to the others and without moving the frame along the trackway, whereby a load suspended from the cables may be skewed in an approximately horizontal plane.

3. In combination, an overhead trackway, a rigid frame traveling thereon, load-engaging elements carried by the frame, means for raising and lowering said elements, and means for shifting some of the elements laterally and relatively to the frame while retaining the others stationary whereby a load suspended therefrom may be swung about one end thereof.

4. In combination, an overhead trackway, a crane traveling thereon, hoisting mechanism carried by the crane, said hoisting mechanism comprising cables and drums, means for rotating said drums to raise or lower a load, and means for shifting some of the cables laterally with relation to the drums without moving the frame along the trackway, whereby a load suspended from the cables may have one end thereof swung in a horizontal plane, said last mentioned means being operable independently of the drum rotating means.

5. In combination, a rectangular load, hoisting means therefor, said means comprising hoisting drums positioned centrally over the load, and load-engaging cables positioned so as to engage the load adjacent to the corners thereof, means for moving the load-engaging elements adjacent to one end of the load with relation to the elements on the other end of the load and to the drums, whereby one end of the load is displaced from its original position.

6. In combination, a rigid frame, four load-engaging elements carried thereby and positioned adjacent to the four corners of a rectangle, and means for moving two of the elements laterally with relation to the other elements and with relation to the frame.

7. In combination, a winding drum, cables leading therefrom, a sheave acting as a guide for each cable, means for moving some of the sheaves in a path parallel and relative to said drums, whereby a load suspended from the cables may be turned obliquely.

8. In combination, a frame, a rotary drum thereon, sheaves carried by the frame, cables leading from the drum and passing over the sheaves, there being one cable to each sheave, and means for shifting some of the sheaves with relation to the drum whereby a load suspended from the cables may be turned obliquely.

9. In combination, an overhead trackway, a rigid frame traveling thereon, hoisting mechanism carried by the frame, said mechanism comprising a plurality of load-engaging elements, means for moving some of the elements simultaneously and in the some direction with relation to the other elements and with relation to the frame, whereby a load suspended therefrom may be swung laterally about one end thereof.

10. In a device of the character described, the combination with a set of overhead tracks, of a rigid frame traveling thereon, hoisting mechanism carried by the frame and having load-engaging elements depending therefrom, and means associated with said elements for shifting one end of a load laterally with relation to said frame, while the other end remains substantially stationary.

11. In a hoisting mechanism, the combination with a set of drums, of cables leading from each drum and in opposite directions, sheaves providing guides for said cables, and means for moving some of the sheaves with relation to the drums whereby cables passing over movable sheaves are shifted laterally and simultaneously with relation to the drums.

12. In a hoisting mechanism, the combination with a rigid frame, of a set of drums, cables leading therefrom, means for rotating the drums in the same direction, sheaves providing guides for cables and positioned approximately at the corners of a rectangle, and means for shifting the sheaves at one end of the rectangle relatively to the frame, while retaining the sheaves at the other end stationary.

13. In combination with a rigid frame, of four sheaves mounted thereon, four flexible raising members depending from said sheaves, and means for moving two of said sheaves relative to said frame.

14. In a hoisting mechanism, the combination with a rigid frame, of four flexible raising elements mounted thereon, means for simultaneously raising or lowering said elements, four sheaves over which said elements extend, and means for shifting two of said sheaves as a unit relative to the frame and relative to the other two sheaves.

15. In combination, four load-engaging elements, four sheaves acting as guides for said elements, a shaft connecting two of the sheaves, a frame supporting said shaft, and means for moving the shaft longitudinally of the axis thereof and relatively to the frame whereby the sheaves carried by the shaft are shifted simultaneously.

16. In a hoisting mechanism, the combination with load-engaging elements, of a pair of aligned sheaves acting as guides therefor, means for raising and lowering said elements, a member connecting said sheaves and providing a bearing therefor, a traveling support for said member, and means for shifting said member axially and relatively to the support, said means being operable independently of the raising means.

17. In a hoisting mechanism, the combination with a set of aligned drums, of means for rotating said drums in either direction, sheaves positioned adjacent the four corners of a rectangle, each of said sheaves having the axis thereof parallel to the axis of the drums, cables leading from the drums and passing over the respective sheaves, a member rigidly connecting two of the sheaves and constituting a support therefor, and means for shifting said member parallel to the axis of the drum, whereby cables passing over the sheaves on said member are shifted simultaneously, and in the same direction.

18. In a hoisting mechanism, the combination with a frame, of a set of drums mounted thereon, means for rotating the drums in either direction, sheaves carried on the frame, cables leading from the drums and passing over the sheaves, a shiftable member connecting the sheaves on one side of the drums, and an electric motor geared with said member, said motor being reversible, whereby the last mentioned sheaves may be shifted laterally and in either direction with relation to the supporting frame.

19. In a hoisting mechanism, the combination with a frame, of four sheaves carried thereby and positioned approximately in the form of a rectangle, cables leading over the sheaves, a shaft extending between and acting as a bearing for two of the sheaves, a motor geared to the shaft, said motor being operable in either direction to move said shaft axially, whereby the sheaves mounted thereon are shifted simultaneously, in the same direction and relatively to the frame.

In testimony whereof, I hereunto affix my signature.

BENJAMIN F. FITCH.